No. 754,149. PATENTED MAR. 8, 1904.
C. LA DOW.
VEHICLE BODY HANGER.
APPLICATION FILED OCT. 29, 1903.
NO MODEL. 2 SHEETS—SHEET 1.
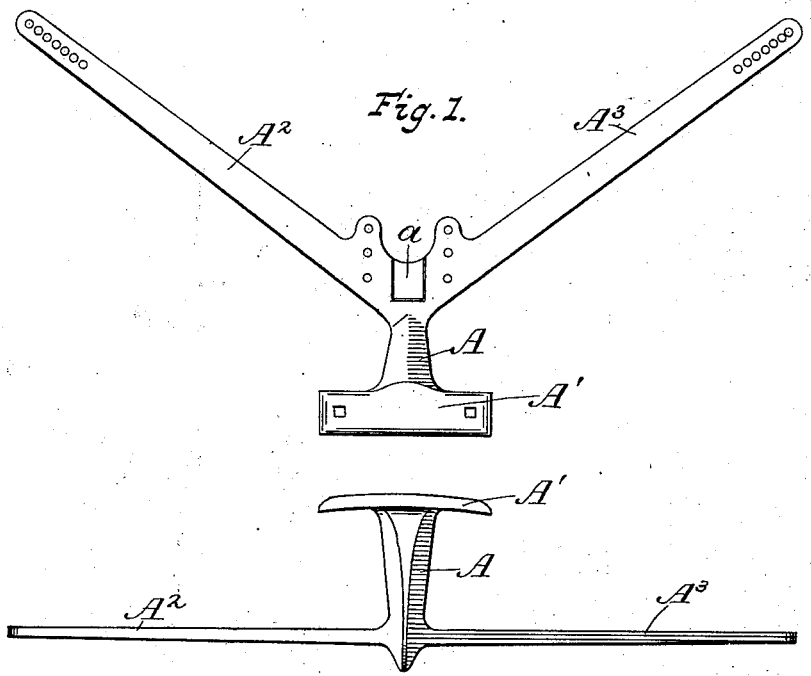
Fig. 1.
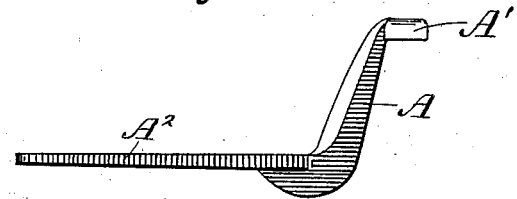
Fig. 2.
Fig. 3.
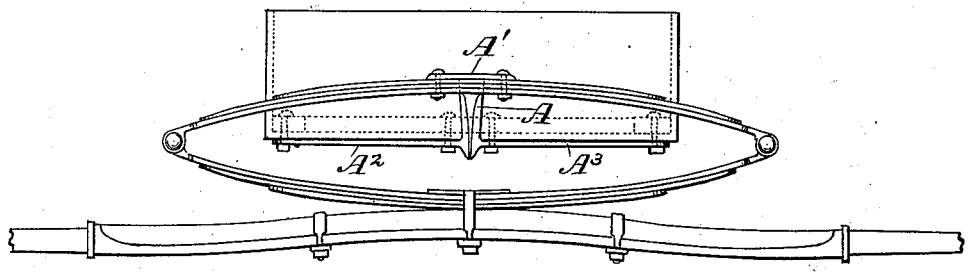
Fig. 4.
Witnesses,
Charles Selkirk
Chas. R. Selkirk
Charles La Dow
Inventor.

No. 754,149. PATENTED MAR. 8, 1904.
C. LA DOW.
VEHICLE BODY HANGER.
APPLICATION FILED OCT. 29, 1903.
NO MODEL. 2 SHEETS—SHEET 2.

Witnesses. Charles La Dow
Charles Selkirk Inventor.
Chas. R. Selkirk

No. 754,149. Patented March 8, 1904.

UNITED STATES PATENT OFFICE.

CHARLES LA DOW, OF ALBANY, NEW YORK.

VEHICLE-BODY HANGER.

SPECIFICATION forming part of Letters Patent No. 754,149, dated March 8, 1904.

Application filed October 29, 1903. Serial No. 178,966. (No model.)

*To all whom it may concern:*

Be it known that I, CHARLES LA DOW, of the city and county of Albany and State of New York, have invented a new and useful Improvement in Vehicles, of which the following is a specification.

My invention relates to a new method for suspending the body of a vehicle to a pair of elliptic springs by the end portions of the vehicle and to a new means for accomplishing said result.

Figure 5:
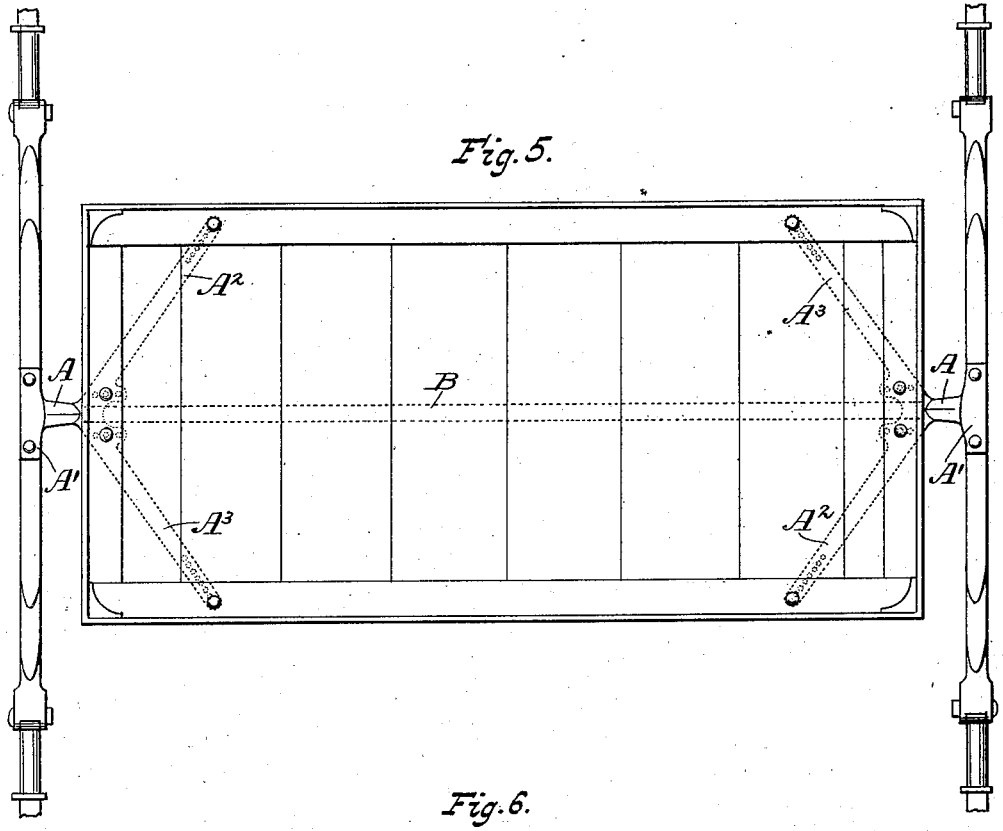
Figure 6:
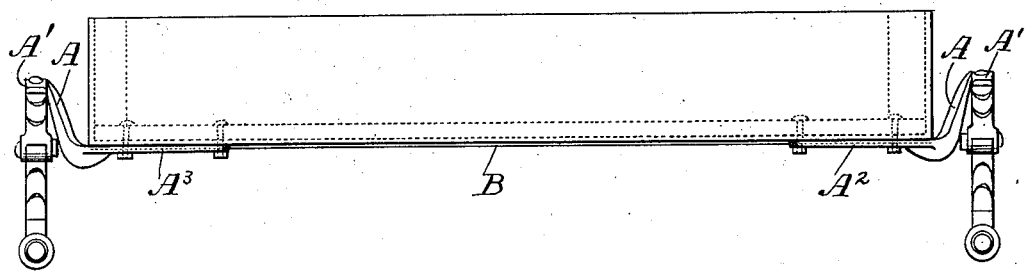
Figure 7:
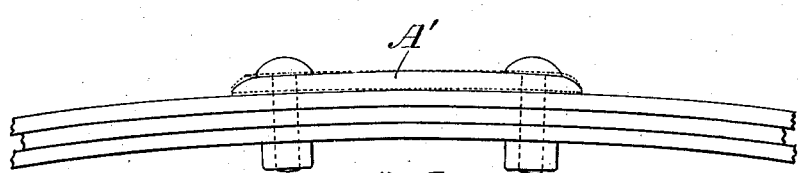

In the drawings, Figure 1 illustrates a plan view of a metal hanger made according to my invention for suspending a vehicle-body between a pair of elliptic springs by the center only of an end of the body. Fig. 2 represents an end view of Fig. 1. Fig. 3 represents a side view of Fig. 1. Fig. 4 represents an end view of Fig. 1 applied to an elliptic spring and to a vehicle-body. Fig. 5 represents a plan view of a pair of my vehicle-body hangers applied to a pair of elliptic springs and to the body of the vehicle. Fig. 6 illustrates a side view of Fig. 5. Fig. 7 represents an end view of the central part of an upper section of an elliptic spring having my hanger bolted thereto.

One purpose of this invention is to mount the body of a vehicle relatively to a pair of elliptic springs by means which shall be principally invisible to the passer-by while the article is in use.

Another object of the invention is to strengthen a vehicle-body by the application of my invention thereto.

Referring to Fig. 1 of the drawings, it will be seen that my hanger consists of a cross-bar A' and two diverging arms A² and A³, which come together and form an apex which is joined to the cross-bar A' by an intervening body portion A. It will also be seen that said body portion A is obliquely inclined relatively to cross-bar A', also that the arms A² and A³ are obliquely inclined relatively to the said body portion A. The portion A', I term a "cross-bar" and the portions A² and A³ "arms," which are joined to each other and to the cross-bar by the body portion A. The extremities of these arms are provided with a series of holes through which bolts are passed to secure them to the side sills of a vehicle-body, as shown in Fig. 5. The said series of holes will accommodate the hanger to various-width bodies. Should any portion of the hanger ends project beyond the sides of said body-sills, they are to be trimmed off, so as not to project. By this it will be seen that one-size hanger will be adapted to fit many-sized vehicle-bodies. The apex of the hanger is provided with two series of holes, through which bolts are passed to secure said apex to the central portion of the end sills of a vehicle-body. The hanger is made of metal.

By reference to Fig. 5 it will be seen that the dotted diagonal lines show the arms of my hanger performing the functions of a brace for each corner of the vehicle's body, thereby overcoming working strains of every kind which are liable to occur. Said diagonally-arranged arms also support the bottom boards of the vehicle's body against strains thereon. The series of holes at the apex aforesaid permit a range of fastening to suit sills of various size or shape that may occur in various styles of vehicle-bodies.

By reference to Figs. 1, 2, 3, and 4 of the drawings it will be seen that the body portion A is of such form as will afford great strength to the hanger and at the same time presenting as small a surface to the range of vision as will be consistent with working strains that are liable to occur, it being well understood that a vehicle-body, especially in light carriage-work, should appear as light and graceful as possible and at the same time be strong enough to carry the required load. I therefore construct my hanger with a body portion which has a wide thin bearing at its engagement with the cross-bar A', said body portion then narrowing down in one direction toward the apex and also widening out in another direction as it joins said apex, so that taken from a rear view the body portion A appears like a small body of metal, particularly at its lower portion, which is the one most in sight, and that taken from a side view, as in Fig. 3. The upper portion of said body A is narrower than its lower portion, and said upper portion being most in sight it presents the appearance of a small body of metal to the eye. This described form therefore appears small and at the same time provides the requisite amount of strength.

The arms $A^2$ and $A^3$ not only support the corners of the wagon against working strains, but they also support the body portion A and its cross-bar A' against working strains and serve to maintain the wagon in proper position when the user is getting into it or leaving it.

By reference to Figs. 1, 2, 5, and 6 it will be seen that the body portion A of my hanger stands obliquely relatively to the cross-bar A' and to the arms $A^2$ and $A^3$, one side of the body portion A being adjacent to the spring, and the opposing side of its lower end being adjacent to the wagon-body. This construction permits the up-and-down action of the vehicle body and springs without permitting the body portion A to strike against the lower section of the elliptic spring while the wagon is being used. It will also be seen that no part of my hanger projects beyond the vehicle-body except the body portion A and cross-bar A'. Consequently the vehicle-body has the appearance of being suspended. It is carried or suspended by the central end portions thereof only.

By reference to Figs. 5 and 6, B represents a thin strip of metal secured to the under side of the vehicle's bottom boards to support them against weights that may be placed on them. The ends of this strip of metal may rest in the recess $a$ of my hanger.

Referring to Fig. 7, it will there be seen that the cross-bar A' of my hanger normally touches only at the central portion of the elliptic spring on which it rests and that the bolts passing through said cross-bar and through the spring may draw the ends of said cross-bar down upon the spring, as shown in Fig. 4, thereby holding the said cross-bar to the spring under spring tension, thus overcoming any tendency of said bolts to work loose when in use, the normal curved radius of the cross-bar A' being greater than the curved radius of the upper member of the elliptic spring.

Another advantage of the construction afforded by my hanger is that the under corners of the sills are not enlarged by any connection from the spring thereto, but are left of a normal size, so that the passer-by misses the usual enlargement of said corners, and notices that the vehicle-body with my hanger appears lighter and smaller than those heretofore used.

It is of course obvious that changes may be made in the size and shape of my hanger without departing from the spirit and scope of my invention and claims, and my invention contemplates any form of construction of hanger that accomplishes any of the results hereinbefore specified.

I claim—

1. As a new article of manufacture, a vehicle-body hanger comprising cross-bar A', arms $A^2$, and $A^3$, obliquely inclined relatively to bar A', and body-bar A located between said arms and the cross-bar.

2. As a new article of manufacture, a vehicle-body hanger comprising cross-bar A', arms $A^2$, and $A^3$, obliquely inclined relatively thereto, and body-bar A, located between said cross-bar and said arms, and obliquely inclined relatively thereto.

3. In combination with a vehicle-body and an elliptic spring therefor, a hanger consisting of a metal cross-bar affixed to a central portion of the upper section of said spring, and a graduated body portion intervening between the spring and the vehicle-body, and triangular arms forming an apex for fastening said hanger to project from the center of an end of the vehicle-body.

4. In combination with a vehicle-body and an elliptic spring means for supporting them relatively to each other by adjacent and central points only, consisting of a triangular metal structure having a graduated body portion and arms affixed to the apex of the triangle and a cross-bar affixed to said body portion, bolts for affixing cross-bar portion to the spring, and a bolt for affixing its apex to a central end portion of the vehicle-body and bolts for affixing the ends of the triangle arms to the under sides of the vehicle-body.

5. In combination with a vehicle-body a hanger therefor having an apex attachable to said body at its end central portion, and arms radiating from the apex diagonally under the bottom of the vehicle and attachable to the side sills of its body in a line inside the corners thereof.

6. A triangular-shaped hanger for a vehicle-body having an apex, and arms radiating therefrom, and a channel in said apex to receive the central bottom-board-supporting strap of a vehicle-body.

CHARLES LA DOW

Witnesses:
EDWARD KUESTNER,
CHAS. W. LA DOW.